United States Patent [19]
Burnell et al.

[11] Patent Number: 5,470,276
[45] Date of Patent: Nov. 28, 1995

[54] DIFFUSER AIR OUTLET

[75] Inventors: Joseph G. Burnell, Harrison Township; Gary J. Clark, Troy, both of Mich.

[73] Assignee: Aeroquip Corporation, Maumee, Ohio

[21] Appl. No.: 124,927

[22] Filed: Sep. 21, 1993

[51] Int. Cl.⁶ ........................... B60H 1/34
[52] U.S. Cl. ........................... 454/155; 454/319
[58] Field of Search ........................... 454/109, 155, 454/202, 313, 315, 319, 320

[56] References Cited

U.S. PATENT DOCUMENTS

| | | |
|---|---|---|
| 2,317,798 | 4/1943 | Otto . |
| 2,345,503 | 3/1944 | Reece ........................... 454/313 X |
| 2,901,961 | 9/1959 | Cotts . |
| 3,495,521 | 2/1970 | Foster . |
| 3,648,590 | 3/1972 | Mercier ........................... 454/155 |
| 4,664,022 | 5/1987 | Oddenino . |
| 4,664,023 | 5/1987 | Miyadera et al. . |
| 4,840,113 | 6/1989 | Freitag et al. . |
| 4,970,947 | 11/1990 | Soethout . |
| 5,063,833 | 11/1991 | Hara et al. ........................... 454/155 X |
| 5,080,002 | 1/1992 | Soethout et al. ........................... 454/154 |
| 5,120,272 | 6/1992 | Soethout et al. ........................... 454/155 |
| 5,176,571 | 1/1993 | Fujihara et al. ........................... 454/320 |
| 5,340,357 | 8/1994 | Nagai et al. ........................... 454/155 |
| 5,364,303 | 11/1994 | Terry ........................... 454/155 |

FOREIGN PATENT DOCUMENTS

| | | | |
|---|---|---|---|
| 659926 | 1/1963 | Canada ........................... 454/313 |
| 0257500 | 8/1987 | European Pat. Off. . | – |
| 2616386 | 12/1988 | France . | |
| 2619438 | 2/1989 | France ........................... 454/155 |
| 2003697 | 1/1971 | Germany . | |
| 58-33048 | 2/1983 | Japan . | |
| 60-175955 | 9/1985 | Japan . | |
| 60-244618 | 12/1985 | Japan . | |
| 86529 | 5/1986 | Japan ........................... 454/155 |

*Primary Examiner*—Harold Joyce
*Attorney, Agent, or Firm*—Bliss McGlynn

[57] ABSTRACT

A diffuser air outlet includes a plurality of directional vanes journaled generally parallel to each other, and a vane linkage arm assembly for connecting the directional vanes into at least two distinct groups and for moving the distinct groups between a focused position and a diffused position.

14 Claims, 5 Drawing Sheets

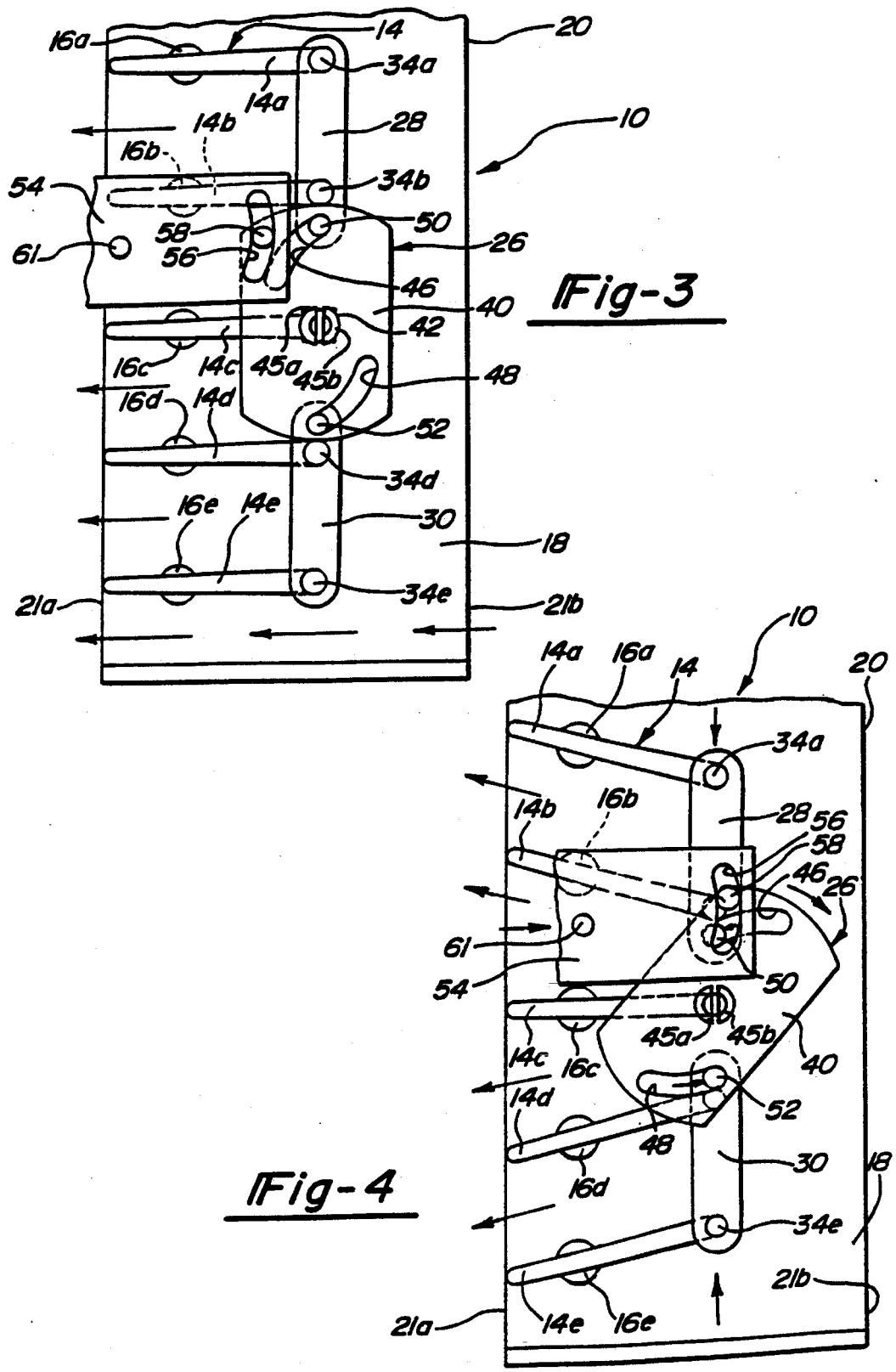

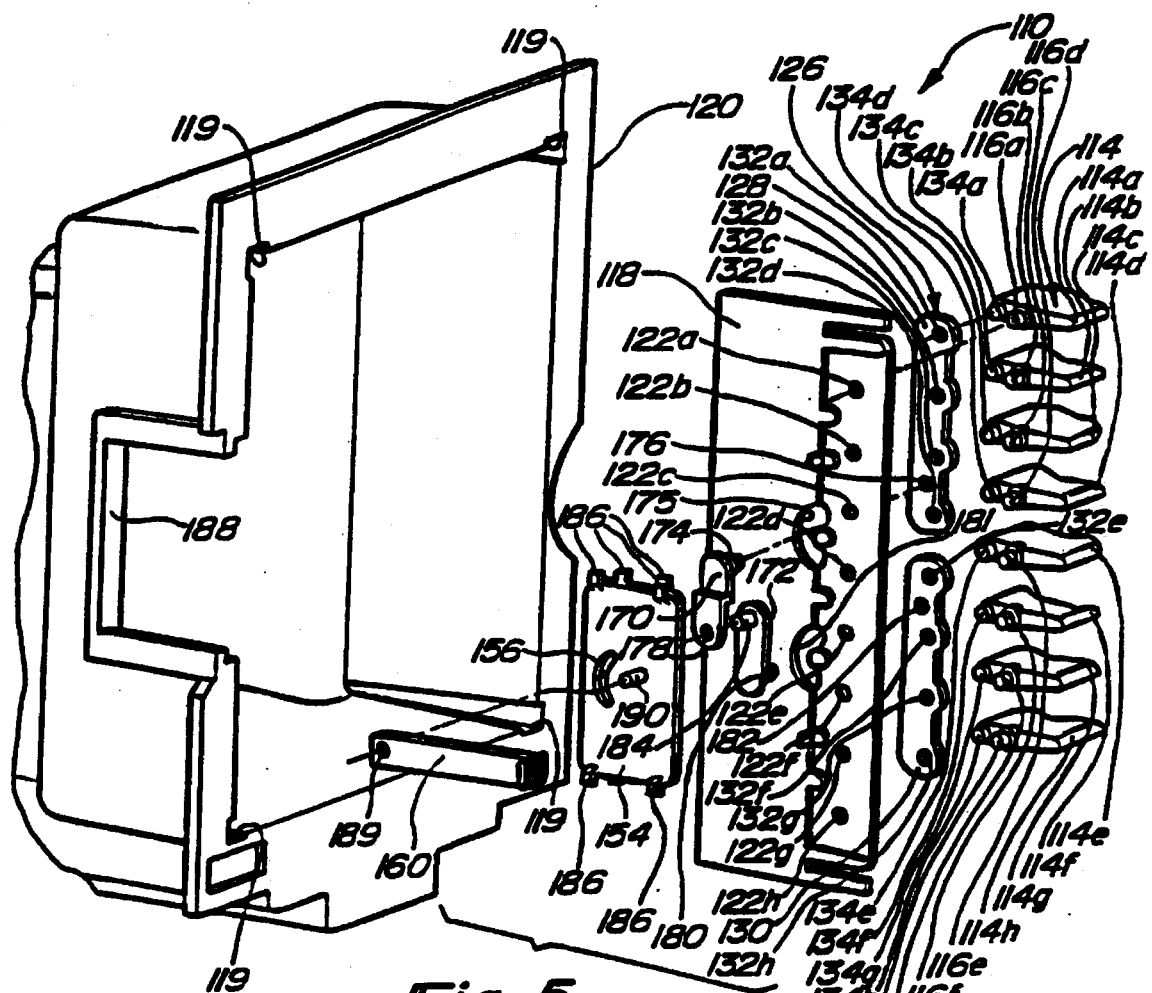
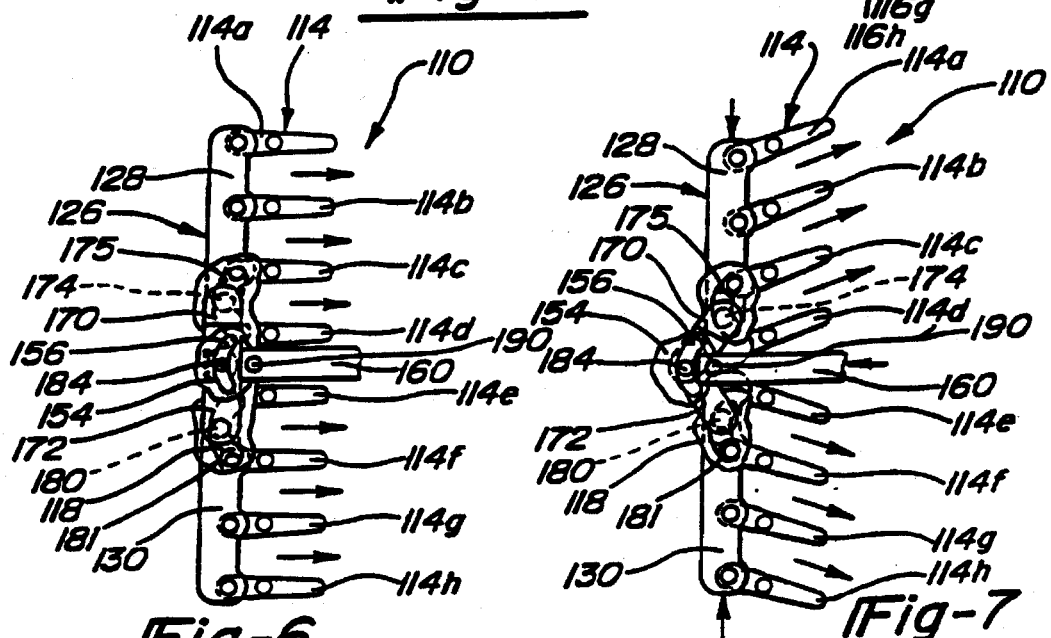

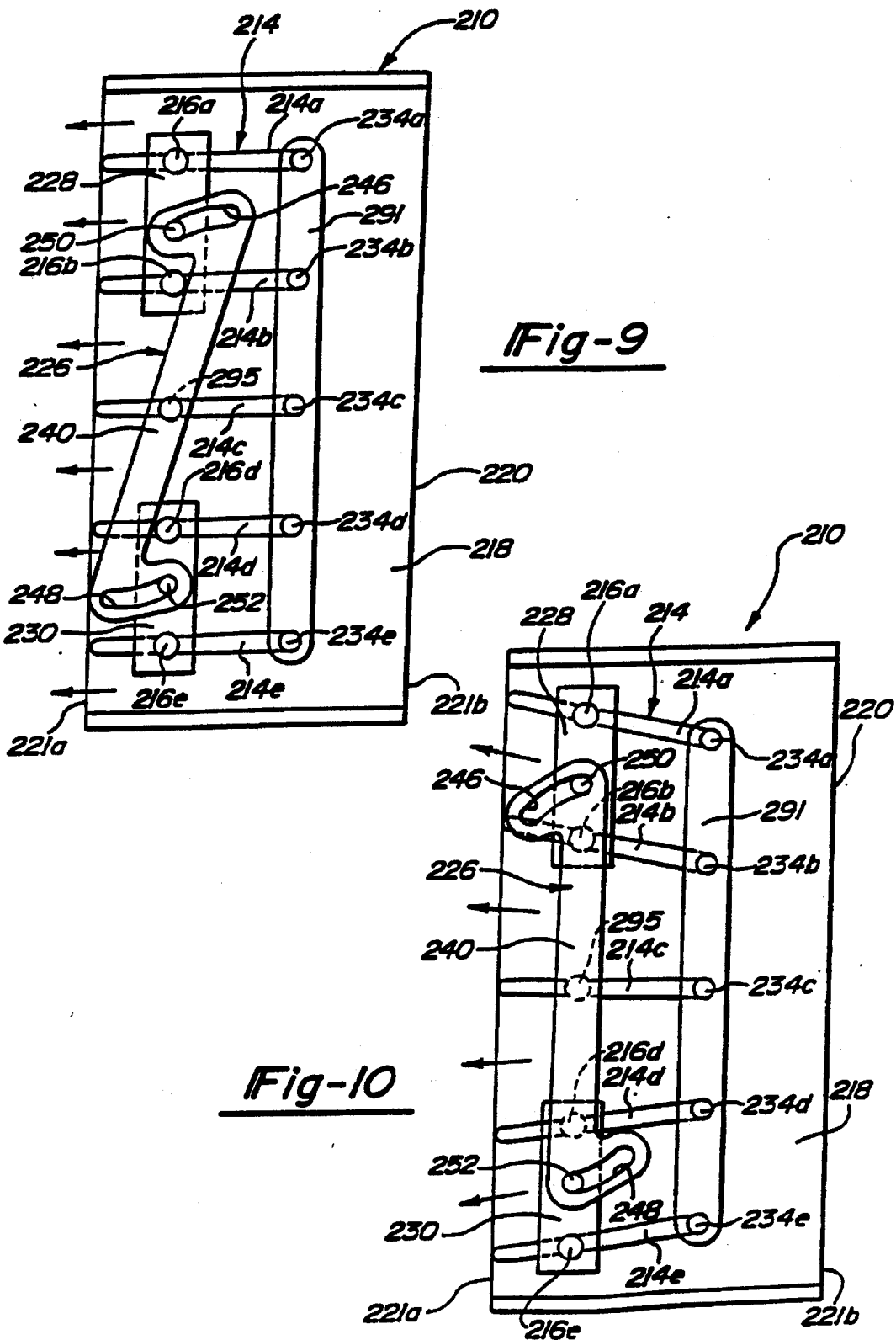

DIFFUSER AIR OUTLET

BACKGROUND OF THE INVENTION

1. Field of the Invention

The present invention relates generally to ventilation systems for automotive vehicles and, more particularly, to a diffuser air outlet for a ventilation system on an automotive vehicle.

2. Description of the Related Art

A standard air outlet for a ventilation system on an automotive vehicle typically includes a series of parallel directional vanes that pivot about fixed centerpoints and are connected by a linkage arm so that all vanes move uniformly. This arrangement allows a focused stream of air to be emitted from the air outlet, causing a specific location within an occupant compartment of the automotive vehicle to be heated/cooled where the directional vanes are aimed.

Although the standard air outlet works well, it may be desired to have an air outlet that will emit air in a less focused (diffused) stream, thereby achieving a general heating/cooling of the occupant compartment.

SUMMARY OF THE INVENTION

It is, therefore, one object of the present invention to provide a diffuser air outlet for a ventilation system on an automotive vehicle.

It is another object of the present invention to provide an air outlet that emits both a focused and a diffused stream of air.

To achieve the foregoing objects, the present invention is a diffuser air outlet including a plurality of directional vanes journaled generally parallel to each other. The diffuser air outlet also includes means for connecting the directional vanes into at least two distinct groups and rotatable means cooperating with the connecting means for moving the distinct groups between a focused position and a diffused position.

One advantage of the present invention is that a diffuser air outlet is provided for a ventilation system on an automotive vehicle. Another advantage of the present invention is that the diffuser air outlet will emit air in both a highly focused and a less focused (diffused) stream to achieve a general heating/cooling of the occupant compartment of the automotive vehicle.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 3 is a side elevational view of the diffuser air outlet of FIGS. 1 and 2 illustrated in a focused position.

FIG. 4 is a view similar to FIG. 3 illustrating the diffuser air outlet in a diffused position.

FIG. 5 is an exploded perspective view of a first alternate embodiment of the diffuser air outlet of FIGS. 1 and 2.

FIG. 6 is a fragmentary side elevational view of the diffuser air outlet of FIG. 5 illustrated in a focused position.

FIG. 7 is a view similar to FIG. 6 illustrating the diffuser air outlet in a diffused position.

FIG. 9 is a side elevational view of the diffuser air outlet of FIG. 8 illustrated in a focused position.

FIG. 10 is a view similar to FIG. 9 illustrating the diffuser air outlet in a diffused position.

DESCRIPTION OF THE PREFERRED EMBODIMENTS(S)

Figure 1:
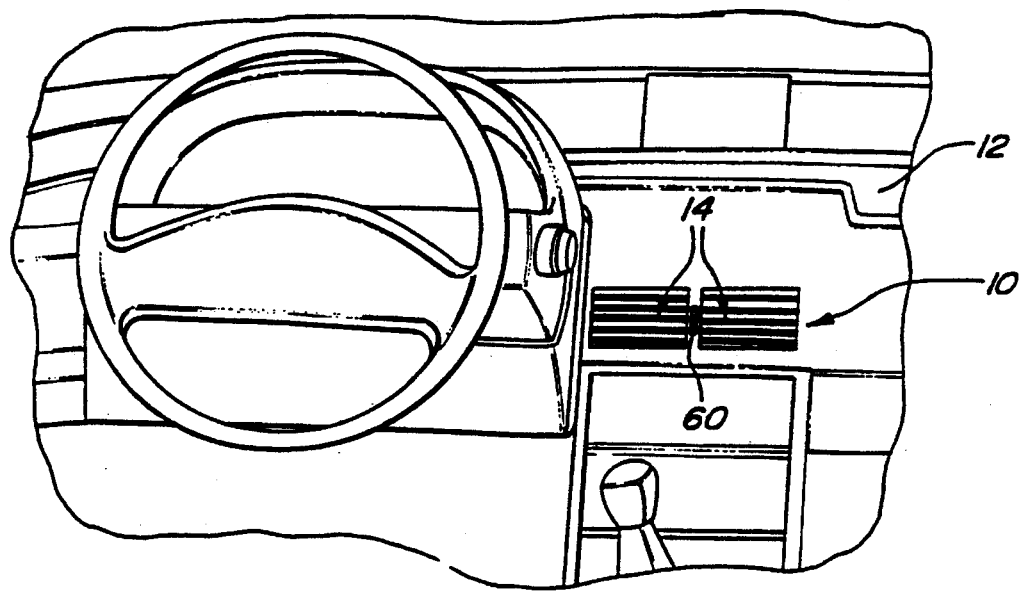
FIG. 1 is a perspective view of a diffuser air outlet, according to the present invention, illustrated in operational relationship with an occupant compartment of an automotive vehicle.

Referring to FIG. 1, a diffuser air outlet 10, according to the present invention, is illustrated in operational relationship with an occupant compartment 12 of an automotive vehicle. The diffuser air outlet 10 is part of a ventilation and/or air conditioning system (not shown) of the automotive vehicle. It should be appreciated that air is emitted from the diffuser air outlet 10 into the occupant compartment 12.

Figure 2:
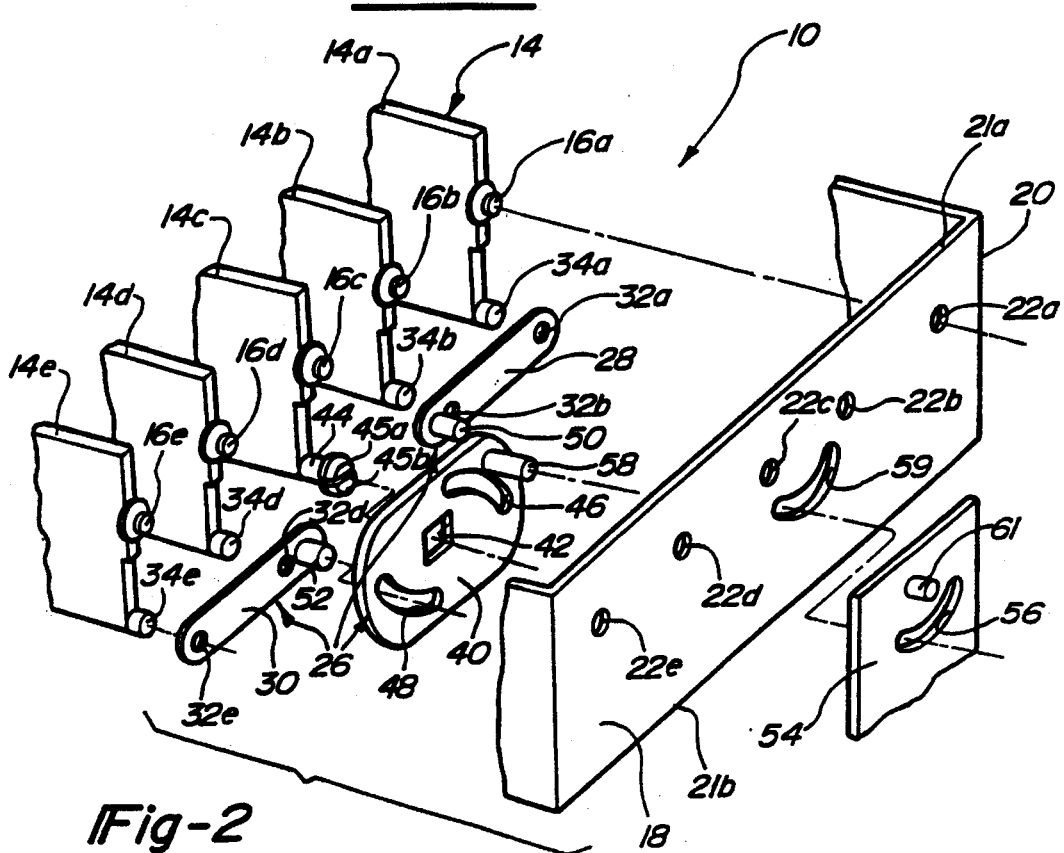
FIG. 2 is an exploded perspective view of the diffuser air outlet of FIG. 1.

Referring to FIGS. 1 and 2, the diffuser air outlet 10 includes a plurality of directional vanes, generally indicated at 14, to direct the air emitted from the diffuser air outlet 10. The directional vanes 14 are generally planar and rectangular in shape. In this embodiment, five directional vanes 14a, 14b, 14c, 14d, 14e are pivotally supported near their front edge by rotatable journals 16a, 16b, 16c, 16d, 16e, respectively, within a wall section 18 of an outlet housing 20. The journals 16a through 16e are disposed in corresponding apertures 22a through 22e, respectively, of the wall section 18. The outlet housing 20 has a front edge 21a and a rear edge 21b. It should be appreciated that the directional vanes 14 swivel around horizontal swivel axes extending generally parallel and at a fixed distance to each other near the front edge 21a of the outlet housing 20. It should also be appreciated that air flows from the rear edge 21b to the front edge 21a as indicated by the arrows in FIG. 3.

Referring to FIGS. 2 and 3, the diffuser air outlet 10 also includes a vane linkage arm assembly, generally indicated at 26, to connect and divide the directional vanes 14 into a plurality of, preferably three, distinct groups, allowing the groups to be positioned either parallel or at angles to each other. The vane linkage arm assembly 26 includes a pair of vane linkage arms 28 and 30 to connect the directional vanes 14a,14b and 14d,14e, respectively, into two distinct groups. The vane linkage arm 28 is generally linear and has two apertures 32a and 32b which receive journal members 34a and 34b protruding near a rear edge of directional vanes 14a and 14b, respectively, to rotate therein. The vane linkage arm 30 is generally linear and has two apertures 32d and 32e which receive journal members 34d and 34e protruding near a rear edge of directional vanes 14d and 14e, respectively, to rotate therein.

The vane linkage arm assembly 26 also includes a rotatable cam plate 40. The cam plate 40 is generally rectangular in shape and has a central aperture 42 extending therethrough to receive a projection 44 protruding near a rear edge of the directional vane 14c. The projection 44 may have an enlarged head of spaced fingers 45a and 45b which deflect and expand through the aperture 42 to secure the cam plate 40 to the directional vane 14c. The cam plate 40 also has a pair of tracks or slots 46 and 48 extending therethrough. The tracks 46 and 48 are curved or arcuate and oppose each other. The tracks 46 and 48 have a center axis corresponding to a center axis of the aperture 42. The tracks 46 and 48 receive corresponding pins 50 and 52 protruding from the vane linkage arms 28 and 30, respectively. It should be appreciated that the curved tracks 46 and 48 are designed with a "cam" motion; that is, as the cam plate 40 is rotated, the distance of the track 46,48 from the center of rotation varies to move the pins 50,52 either closer in or farther away relative to the center of rotation. It should also be appreciated that the directional vane 14c is a central or control vane that provides the function of holding the vane linkage arms 28 and 30 in either a parallel vane (focused) position or an angled vane (diffused) position.

The diffuser air outlet 10 includes a moveable positioning plate 54 to align the cam plate 40 into either the focused or diffused position. The positioning plate 54 is generally planar and rectangular in shape and has a curved or arcuate control aperture 56 near one end. The control aperture 56 receives an actuating pin 58 protruding from the cam plate 40 which also extends through a curved or arcuate wall aperture 59 in the wall section 18. The diffuser air outlet 10 also includes an actuator component such as a rotatable wheel 60 (FIG. 1) connected to a pin member 61 on the positioning plate 54 to move the positioning plate 54. It should be appreciated that the actuator component may be any suitable means such as a push button, slidable knob or similar device connected to the pin member 61 to move the positioning plate 54. It should also be appreciated that the control aperture 56 and wall aperture 59 for the actuating pin 58 on the cam plate 40 allows for the required motion of the cam plate 40 while the diffuser air outlet 10 is in the parallel vane or focused position.

In operation, the diffuser air outlet 10 has a normal parallel vane or focused position for a focused air flow as illustrated in FIG. 3. The positioning plate 54 is at a position closest the front edge 21a of the outlet housing 20 to hold the position of the cam plate 40 at a point where the pins 50 and 52 of the vane linkage arms 28 and 30, respectively, are at the ends of the tracks 46 and 48. This position provides equal spacing of the pivot points of the vane linkage arms 28 and 30 equal to the spacing of the fixed pivot points of the journals 16a through 16e, making the directional vanes 14 all parallel. In this position, the diffuser air outlet 10 operates similar to the standard air outlet; that is, the parallel directional vanes 14 provide a focused air stream within the occupant compartment 12.

To achieve an angled vane or diffused position for a diffused air flow as illustrated in FIG. 4, the positioning plate 54 is moved linearly or displaced in an axial or horizontal direction toward the rear edge 21b of the outlet housing 20. As a result, the actuating pin 58 moves along the control aperture 56 and the cam plate 40 is rotated and held at a point so that the pins 50 and 52 from the vane linkage arms 28 and 30 are in a track position that has pulled the vane linkage arms 28 and 30 toward each other (the control directional vane 14c remains in a neutral position). This action will cause the three groups of vanes to be at an angle to each (the first group 14a and 14b pointing to one side, control vane 14c centered, the second group 14d and 14e pointing towards the other side). In this configuration, the directional vanes 14 direct the air stream in opposing directions, causing the desired diffused air flow.

Referring to FIGS. 5 through 7, a first alternate embodiment 110 of the diffuser air outlet 10 is shown. Like parts of the diffuser air outlet 10 have like reference numerals increased by one hundred (100). In the diffuser air outlet 110, eight (8) directional vanes 114a through 114h are pivotally supported by rotatable journals 116a through 116h within the wall section 118. The wall section 118 is disposed in tracks 119 of the outlet housing 120. The journals 116a through 116h are disposed in corresponding apertures 122a through 122h of the wall section 118.

The vane linkage arm assembly 126 connects and divides the directional vanes 114 into two distinct groups 114a through 114d and 114e through 114h, allowing the groups to be positioned either parallel or at angles to each other. The vane linkage arm 128 has four (4) apertures 132a through 132d which receive journal members 134a through 134d of directional vanes 114a through 114d to rotate therein. The vane linkage arm 130 has four (4) apertures 132e through 132h which receive journal members 134e through 134h of directional vanes 114e through 114h to rotate therein.

The vane linkage arm assembly 126 also includes two connecting links 170 and 172 that will hold the vane linkage arms 128 and 130 in either the parallel vane (focused) position or the angled vane (diffused) position. The connecting link 170 has a pin 174 at one end which extends through a curved or arcuate track 175 in the wall section 118 and an aperture 176 in the vane linkage arm 128. The connecting link 170 also has an aperture 178 at the other end. The connecting link 172 has a pin 180 at one end which extends through a curved or arcuate track 181 in the wall section 118 an aperture 182 in the vane linkage arm 130. The connecting link 172 also has a pin 184 at its other end which extends through the aperture 178 in the connecting link 170 to connect the vane linkage arms 128,130 and connecting links 170,172 together. It should be appreciated that the sizing of the connecting links 170,172 is such that they hold the spacing of the pivot points for the vane linkage arms 128 and 130 equal to the spacing of the fixed pivot points of the journals 116a through 116h (making the vanes 114 parallel) when the connecting links 170 and 172 are in an "in line" position as illustrated in FIG. 6.

The diffuser air outlet 110 further includes a moveable positioning plate 154 to align the connecting links 170 and 172 into either a focused or diffused position to be described. The positioning plate 154 is generally planar and rectangular in shape and has a curved or arcuate control aperture 156 near one end. The control aperture 156 receives the pin 184 protruding from the connecting link 172. The positioning plate 154 has tabs 186 at opposed ends to allow the plate 154 to slide along a recess 188 in a wall of the outlet housing 120. The diffuser air outlet 110 also includes an actuator component such as a push button 160 having an aperture 189 which receives a pin member 190 on the positioning plate 154 to move the positioning plate 154 in a linear or horizontal direction. It should be appreciated that the actuator component may be any suitable means such as a rotatable wheel, slidable knob or similar device connected to the pin member 190 which would move the positioning plate 154. It should also be appreciated that the control aperture 156 in the positioning plate 154 for the pin 184 on the connecting link 172 allows for the required motion of the connecting links 170 and 172 while the diffuser air outlet 110 is in the parallel vane or focused air stream position.

To achieve the normal parallel vane or focused position as illustrated in FIG. 6, the pin 184 for the two connecting links 170 and 172 is moved by the positioning plate 154 to hold the connecting links 170 and 172 in an "in line" position. In this configuration, the diffuser air outlet 110 operates similar to the diffuser air outlet 10; that is, the directional vanes 114 will move parallel to each other, directing the air stream in a focused manner within the occupant compartment 12.

To achieve the angled vane or diffused position as illustrated in FIG. 7, the actuating pin 184 for the two connecting links 170 and 172 is moved by the positioning plate 154 so that the connecting links 170 and 172 are no longer "in line". This action will pull the vane linkage arms 128 and 130 for the two distinct vane groups 114a through 114d and 114e through 114h in towards each other, causing the vane groups to be at an angle to each other. In this configuration, the directional vanes 114 will direct the airstream in opposing directions, causing the desired diffused air flow.

Figure 8:
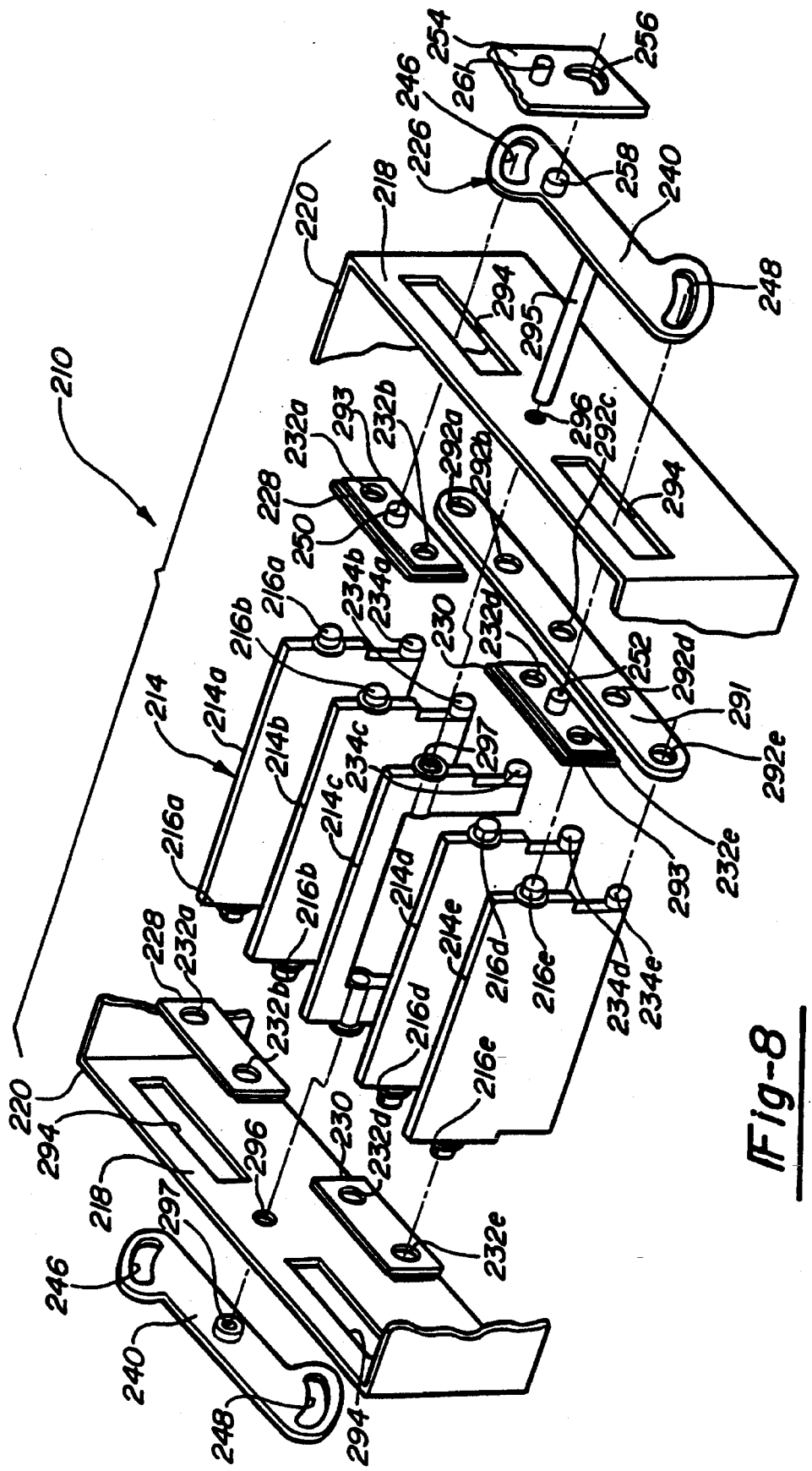
FIG. 8 is an exploded perspective view of a second alternate embodiment of the diffuser air outlet of FIGS. 1 and 2.

Referring to FIGS. 8 through 10, a second alternate embodiment 210 of the diffuser air outlet 10 is shown. Like parts of the diffuser air outlet 10 have like reference numerals increased by two hundred (200). In the diffuser air outlet 210, five (5) directional vanes 214a through 214e are pivotally supported near their rear edge by journal members 234a through 234e within a connecting linkage arm 291. The journal members 234a through 234e are disposed in corresponding apertures 292a through 292e of the connecting linkage arm 291. The connecting linkage arm 291 is generally linear and allows the directional vanes 214 to swivel around horizontal axes extending generally parallel and at a fixed distance to each other near a rear edge thereof.

The vane linkage arm assembly 226 connects and divides the directional vanes 214 into a plurality of, preferably three, distinct groups, allowing the groups to be positioned either parallel or at angles to each other. The vane linkage arm assembly 226 includes a pair of moveable vane linkage arms 228 and 230 to connect the directional vanes 214a,214b and 214d,214e, respectively, into two distinct groups. The vane linkage arm 228 is generally linear and has two apertures 232a and 232b which receive rotatable journals 216a and 216b protruding near a front edge of directional vanes 214a and 214b, respectively, to rotate therein. The vane linkage arm 230 is generally linear and has two apertures 232d and 232e which receive rotatable journals 216d and 216e protruding near a front edge of directional vanes 214d and 214e, respectively, to rotate therein. The vane linkage arms 228 and 230 also have a stepped portion 293 which is generally rectangular in shape and disposed in generally rectangular tracks 294 in a wall section 218 of the outlet housing 220. It should be appreciated the vane linkage arms 228 and 230 slide along the tracks 294.

The vane linkage arm assembly 226 also includes a rotatable cam plate 240 on each side of the wall section 218 of the outlet housing 220. The cam plates 240 are generally "Z" shaped and one of the cam plates 240 has a rod member 295 extending through apertures 296 in the wall sections 218 and a passageway 297 extending through the directional vane 214c and received in a cavity 297 in the other cam plate 240. The cam plates 240 also have a pair of tracks or slots 246 and 248 extending through the ends thereof. The tracks 246 and 248 are curved or arcuate and oppose each other. The tracks 246 and 248 have a center axis corresponding to a center axis of the rod member 295. The tracks 246 and 248 receive corresponding pins 250 and 252 protruding from the vane linkage arms 228 and 230, respectively. It should be appreciated that the curved tracks 246 and 248 are designed with a "cam" motion; that is, as the cam plates 240 are rotated, the distance of the track 246,248 from the center of rotation varies to move the pins 250,252 either closer in or farther away relative to the center of rotation. It should also be appreciated that the directional vane 214c is a central or control vane that provides the function of holding the vane linkage arms 228 and 230 in either a parallel vane (focused) position or an angled vane (diffused) position.

The moveable positioning plate 254 aligns the cam plates 240 into either the focused or diffused position. The positioning plate 254 is generally planar and rectangular in shape and has a curved or arcuate control aperture 256 near one end. The control aperture 256 receives an actuating pin 258 protruding from one of the cam plates 240. The diffuser air outlet 210 also includes an actuator component such as a rotatable wheel (not shown) connected to a pin member 261 on the positioning plate 254 to move the positioning plate 254. It should be appreciated that the actuator component may be any suitable means such as a push button, slidable knob or similar device connected to the pin member 261 to move the positioning plate 254. It should also be appreciated that the control aperture 256 in the positioning plate 254 for the actuating pin 258 on the cam plate 240 allows for the required motion of the cam plates 240 while the diffuser air outlet 210 is in the parallel vane or focused position.

In operation, the diffuser air outlet 210 has a normal parallel vane or focused position for a focused air flow as illustrated in FIG. 9. The positioning plate 254 holds the position of the cam plates 240 at a point where the pins 250 and 251 of the vane linkage arms 228 and 230, respectively, are in a track position that provides a spacing of the vane moveable pivot points of the journals 216a through 216e equal to the spacing of the fixed pivot points for the journal members 234a through 234e disposed in the apertures 292a through 292e of the connecting linkage arm 291, making the directional vanes 214 all parallel. In this position, the diffuser air outlet 210 operates similar to the standard air outlet; that is, the parallel directional vanes 214 provide a focused air stream within the occupant compartment 12.

To achieve an angled vane or diffused position for a diffused air flow as illustrated in FIG. 10, the positioning plate 254 is moved linearly or displaced in an axial or horizontal direction. As a result, the actuating pin 258 moves along the control aperture 256 and the cam plates 240 are rotated simultaneously and held at a point so that the pins 250 and 252 from the vane linkage arms 228 and 230 are in a track position that has pushed the moveable pivot points of the vane linkage arms 228 and 230 away from each other (the control directional vane 214c remains in a neutral position). This action will cause the three groups of vanes to be at an angle to each (the first group 214a and 214b pointing to one side, control vane 214c centered, the second group 214d and 214e pointing toward the other side). In this configuration, the directional vanes 214 direct the air stream in opposing directions, causing the desired diffused air flow.

Additionally, the cam plate 240 may be substituted for the cam plate 40 in the diffuser air outlet 10 of FIGS. 1 and 2. It should be appreciated that the cam plate 240 would be of a suitable size for use in the diffuser air outlet of FIG. 1.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A diffuser air outlet comprising:

a plurality or directional vanes journaled generally parallel to each other and oriented generally horizontally;

a plurality of moveable vane linkage arms connected to a predetermined number of said directional vanes in each of at least two distinct groups, said vane linkage arms having a plurality of apertures extending therethrough and said directional vanes having journal members protruding at each and therefrom with at least one of said journal members on each of said directional vanes received in said apertures for rotation therein;

rotatable means cooperating with said vane linkage arms for moving said at least two distinct groups between a focused position and a diffused position; and said rotatable means comprising at least one cam plate connected to one of said directional vanes and cooperating with each of said vane linkage arms.

2. A diffuser air outlet as set forth in claim 1 including means for rotating said at least one cam plate.

3. A diffuser air outlet as set forth in claim 2 wherein said rotating means comprises a moveable positioning plate operatively cooperating with said at least one cam plate.

4. A diffuser air outlet as set forth in claim 3 wherein said positioning plate has a control aperture extending therethrough.

5. A diffuser air outlet as set forth in claim 1 wherein each of said directional vanes has a front journal member at one end and a rear journal member at the other end opposite said front journal member.

6. A diffuser air outlet as set forth in claim 5 including an outlet housing having a plurality of apertures spaced at fixed distances, said front journal members being received in said apertures.

7. A diffuser air outlet as set forth in claim 5 including a moveable connecting linkage arm having a plurality of apertures at fixed distances, said rear journal members being received in said apertures.

8. A diffuser air outlet as set forth in claim 1 wherein one of said directional vanes is a control vane which remains centered while said directional vanes move parallel to each other in said focused position.

9. A diffuser air outlet comprising:

a plurality of directional vanes journaled generally parallel to each other;

means for connecting said directional vanes into at least two distinct groups;

rotatable means cooperating with said connecting means for moving said at least two distinct groups between a focused position and a diffused position;

said connecting means comprising a pair of vane linkage arms connected to a predetermined number of said directional vanes in each of said at least two distinct groups;

said rotatable means comprising at least one cam plate connected to one of said directional vanes and cooperating with each of said vane linkage arms; and wherein said at least one cam plate has a pair of tracks opposing each other and being arcuate in shape with said pair of vane linkage arms cooperating with said pair of tracks.

10. A diffuser air outlet comprising:

a plurality of directional vanes journaled generally parallel to each other;

means for connecting said directional vanes into at least two distinct groups;

rotatable means cooperating with said connecting means for moving said at least two distinct groups between a focused position and a diffused position;

said connecting means comprising a pair of vane linkage arms connected to a predetermined number of said directional vanes in each of said at least two distinct groups;

said rotatable means comprising at least one cam plate connected to one of said directional vanes and cooperating with each of said vane linkage arms;

said at least one cam plate having a pair of tracks opposing each other and being arcuate in shape; and wherein each of said vane linkage arms has a pin protruding therefrom and received in one of said tracks.

11. A diffuser air outlet comprising:

a plurality of directional vanes journaled generally parallel to each other;

means for connecting said directional vanes into at least two distinct groups;

rotatable means cooperating with said connecting means for moving said at least two distinct groups between a focused position and a diffused position;

said connecting means comprising a vane linkage arm connected to a predetermined number of said directional vanes in each of said at least two distinct groups;

said rotatable means comprising at least one cam plate connected to one of said directional vanes and cooperating with said vane linkage arms;

means for rotating said at least one cam plate;

said rotating means comprising a moveable positioning plate operatively cooperating with said at least one cam plate;

said positioning plate having a control aperture extending therethrough; and wherein said at least one cam plate has an actuating pin protruding therefrom and received in said control aperture.

12. A diffuser air outlet comprising:

a plurality of directional vanes journaled generally parallel to each other;

means for connecting said directional vanes into at least two distinct groups;

rotatable means cooperating with said connecting means for moving said at least two distinct groups between a focused position and a diffused position;

said connecting means comprising a vane linkage arm connected to a predetermined number of said directional vanes in each of said at least two distinct groups;

said rotatable means comprising at least one cam plate connected to one of said directional vanes and cooperating with said vane linkage arms;

means for rotating said at least one cam plate;

said rotating means comprising a moveable positioning plate operatively cooperating with said at least one cam plate;

said positioning plate having a control aperture extending therethrough;

said at least one cam plate having an actuating pin protruding therefrom and received in said control aperture; and an actuator component for moving said positioning plate linearly.

13. A diffuser air outlet comprising:

a plurality of directional vanes journaled generally parallel to each other;

connecting means comprising a plurality of moveable vane linkage arms connected to a predetermined number of said directional vanes in each of at least two distinct groups;

said vane linkage arms having a plurality of apertures extending therethrough and said directional vanes having journal members protruding at each end therefrom with at least one of said journal members on each of said directional vanes received in said apertures for rotation therein;

at least one rotatable cam plate connected to one of said directional vanes and cooperating with said vane linkage arms for moving said at least two distinct groups between a focused position and a diffused position;

each of said directional vanes having a front journal member at one end and a rear journal member at the other end opposite said front journal member; and an outlet housing having a plurality of apertures spaced at fixed distances, said directional vanes being orientated generally horizontally with said front journal members being received in said apertures of said outlet housing and said rear journal members being received in said apertures of said vane linkage arms.

14. A diffuser air outlet comprising:

a plurality of directional vanes journaled generally parallel to each other, each of said directional vanes having a front journal member at one end and a rear journal member at the other end opposite said front journal member;

a moveable connecting arm having a plurality of apertures at fixed distances, said rear journal members being received in said apertures;

a plurality of moveable vane linkage arms connected to a predetermined number of said directional vanes in each of at least two distinct groups, said vane linkage arms having a plurality of apertures, said front journal members being received in said apertures;

rotatable means cooperating with said vane linkage arms for moving said at least two distinct groups between a focused position and a diffused position; and said rotatable means comprising at least one cam plate connected to one of said directional vanes and cooperating with each of said vane linkage arms.

* * * * *